United States Patent
Weisman

(10) Patent No.: US 9,773,040 B2
(45) Date of Patent: Sep. 26, 2017

(54) SEARCH TOKEN MNEMONIC REPLACEMENT

(71) Applicant: Alan Weisman, Framingham, MA (US)

(72) Inventor: Alan Weisman, Framingham, MA (US)

(*) Notice: Subject to any disclaimer, the term of this patent is extended or adjusted under 35 U.S.C. 154(b) by 332 days.

(21) Appl. No.: 14/703,761

(22) Filed: May 4, 2015

(65) Prior Publication Data

US 2016/0328441 A1 Nov. 10, 2016

(51) Int. Cl.
*G06F 17/30* (2006.01)

(52) U.S. Cl.
CPC .. *G06F 17/30427* (2013.01); *G06F 17/30463* (2013.01)

(58) Field of Classification Search
CPC ............ G06F 17/30427; G06F 17/30463
See application file for complete search history.

(56) References Cited

U.S. PATENT DOCUMENTS

| | | |
|---|---|---|
| 5,617,567 A | 4/1997 | Doktor |
| 5,657,465 A | 8/1997 | Davidson et al. |
| 5,671,416 A | 9/1997 | Elson |
| 5,799,310 A | 8/1998 | Anderson et al. |
| 5,875,334 A | 2/1999 | Chow et al. |
| 5,905,990 A | 5/1999 | Inglett |
| 6,009,422 A | 12/1999 | Ciccarelli |
| 6,016,499 A | 1/2000 | Ferguson |
| 7,424,472 B2 | 9/2008 | Wang et al. |
| 7,505,985 B2 | 3/2009 | Kilroy |
| 8,473,501 B2 | 6/2013 | Weber et al. |
| 8,577,878 B1 | 11/2013 | Riley et al. |
| 2012/0191686 A1 | 7/2012 | Hjelm et al. |
| 2014/0143244 A1 | 5/2014 | Satish et al. |

FOREIGN PATENT DOCUMENTS

| | | |
|---|---|---|
| EP | 2128776 A1 | 12/2009 |
| WO | 2007/080413 A1 | 7/2007 |

OTHER PUBLICATIONS

Windmilll Software Ltd, How to feed live data from a web page into Excel, Apr. 9, 2012, pp. 1-3.*
Kusleika, Get Data from Website that Requires a Login, Mar. 8, 2011, pp. 1-8.*
Guay, Use Online Data in Excel 2010 Spreadsheets, Aug. 4, 2010 pp. 1-6.*
Agarwal, Extract Data from a Web Page into an Excel Spreadsheet, Aug. 21, 2010, pp. 1-5.*

* cited by examiner

*Primary Examiner* — Albert Phillips, III
(74) *Attorney, Agent, or Firm* — Kunzler Law Group

(57) ABSTRACT

For search token mnemonic replacement, code detects the search token mnemonic in a string. The search token mnemonic is associated to a search token that includes a search definition that specifies a search rule for one or more dissimilar search paths. The code searches the search paths using the search rule. In addition, the code replaces the search token mnemonic with the search result in the string.

16 Claims, 26 Drawing Sheets

220

| Connection String |
| 250 |
| Data Source |
| 255 |
| SQL Statement |
| 260 |
| Capture Label |
| 275 |

220

| URL |
| 265 |
| Markup Language Text |
| 270 |
| Capture Tag |
| 210 |
| Capture Label |
| 275 |

180

| Search Result 155 |
|---|
| Search Result 155 |
| Search Result 155 |

Development costs for the third quarter are expected to be RD3QFORECAST, which represents a (RD3Q2015FORECAST / RD3Q2014) *100 % change.

Development costs for the third quarter are expected to be $6.2M, which represents a 23% change.

370 ⎯⎯ 205 ⎯⎯
Development costs for the third quarter are expected to be RD3QFORECAST, which represents a FC-CHG(RD3Q2015FORECAST, RD3Q2014) change.
205j   205

FIG. 4C

FC-CHG(FORECAST,PREVIOUS) = (FORECAST/PREVIOUS) * 100) APPEND "%"
205j  320   320   320   310   320  325   325   310

FIG. 4D

SEARCH TOKEN MNEMONIC REPLACEMENT

FIELD

The subject matter disclosed herein relates to search token mnemonics and more particularly relates to search token mnemonic replacement.

BACKGROUND

Description of the Related Art

A document may rely on data that is not resident within the document.

BRIEF SUMMARY

A program product for search token mnemonic replacement is disclosed. Code detects a search token mnemonic in a string. The search token mnemonic is associated to a search token that includes a search definition that specifies a search rule for one or more dissimilar search paths. The code searches the search paths using the search rules. In addition, the code replaces the search token mnemonic with the search result in the string. A method is also disclosed that performs the functions of the program product.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2J is a schematic block diagram illustrating one embodiment of stored search results;

FIG. 3K is a diagram illustrating one embodiment of a precursor file execution log panel;

FIG. 4A is a text diagram illustrating one embodiment of embedded search token mnemonics;

FIG. 4B is a text diagram illustrating one embodiment of search results replacing search token mnemonics;

FIG. 4C is a text diagram illustrating one embodiment of the functions search token mnemonic;

FIG. 4D is a text diagram illustrating one embodiment of the function definition;

DETAILED DESCRIPTION

Figure 1A:
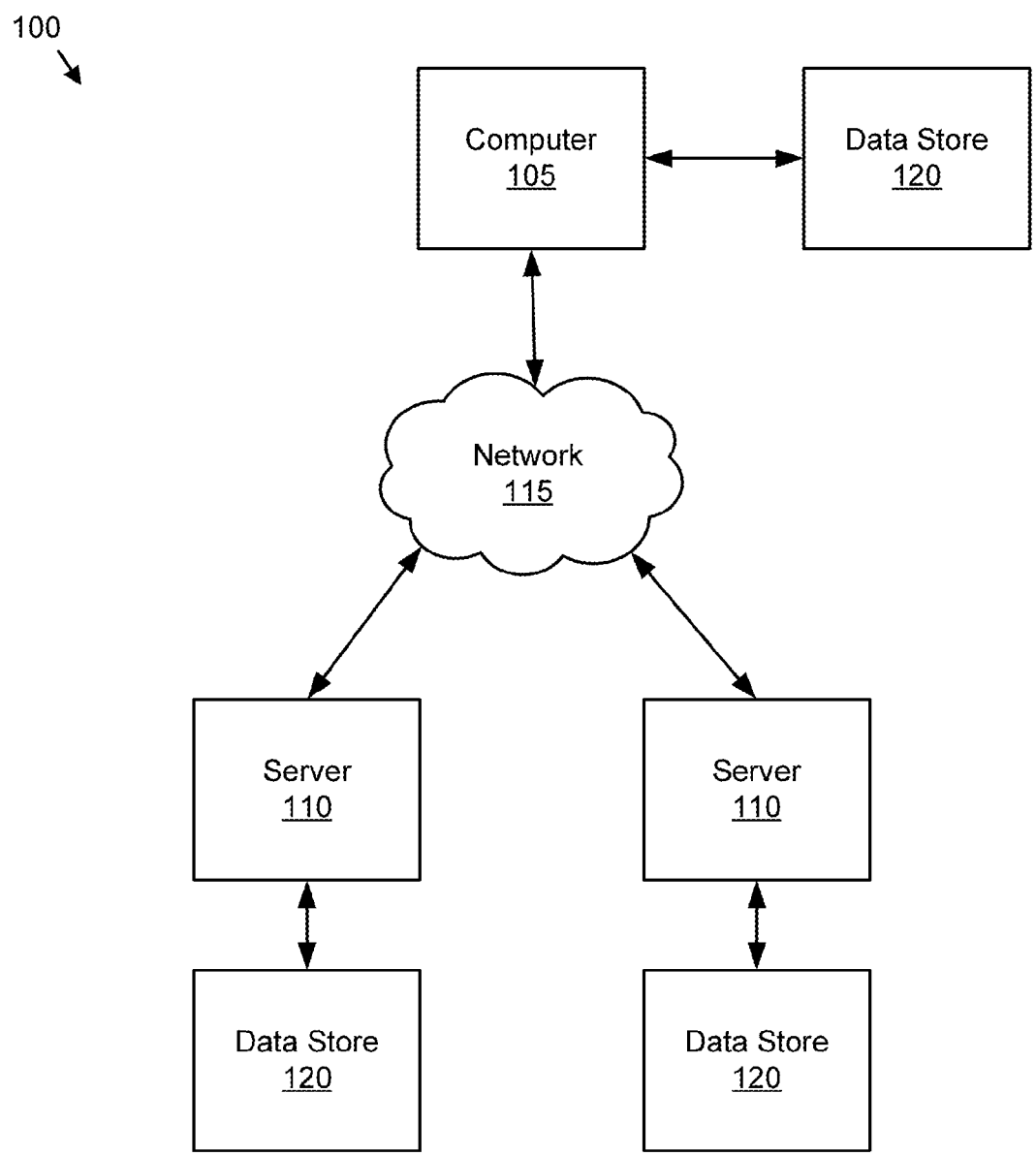
FIG. 1A is a schematic block diagram illustrating one embodiment of a search system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage medium storing machine readable code, computer readable code, and/or program code, referred hereafter as code. The computer readable storage medium may be tangible, non-transitory, and/or non-transmission. The computer readable storage medium may not embody signals. In a certain embodiment, the storage devices only employ signals for accessing code.

The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1A is a schematic block diagram illustrating one embodiment of a search system 100. The search system 100 may search one or more search paths in response to a search token mnemonic and replace the search token mnemonic with the search result. In the depicted embodiment, the search system 100 includes a computer 105, a network 115, one or more servers 110, and one or more data stores 120.

Each data store 120 may be a hard disk drive, a semiconductor storage device, an optical storage device, a micromechanical storage device, or combinations thereof. The network 115 may be the Internet, a mobile telephone network, a wireless network, a wide-area network, a local area network, or combinations thereof.

The data stores 120 store data that may be valuable to the user of the computer 105. For example, the user may prepare documents such as reports and/or communications that employ the data. Unfortunately, in the past, the user needed to retrieve the data from the data stores 120 and then manually insert the data into the documents. The manual retrieval and insertion of the data is often time-consuming.

In addition, the data is often dynamic, and may change regularly as the data stores 120 are updated. As a result, the user is required to regularly retrieve and insert the latest data for the document to be up-to-date.

The embodiments described herein automatically replace the search token mnemonic in the string of the document with search results containing the desired data from the data stores 120. As a result, the user is able to prepare documents that include up-to-date data. In addition, the embodiments may perform operations on the data so that data may be included in the document in a processed form.

The computer 105 may detect the search token mnemonic in a string. The search token mnemonic is associated with a search token. The search token may comprise a search definition that specifies a search rule for one or more dissimilar search paths. The search rule may query the search paths, which may include the data store 120 of the computer 105, the servers 110, and/or the data stores 120 associated with the servers 110. The computer 105 receives the search result for the search rule and replaces the search token mnemonic with the search results in the string. As a result, the string in the document is updated with the latest data.

Figure 1B:
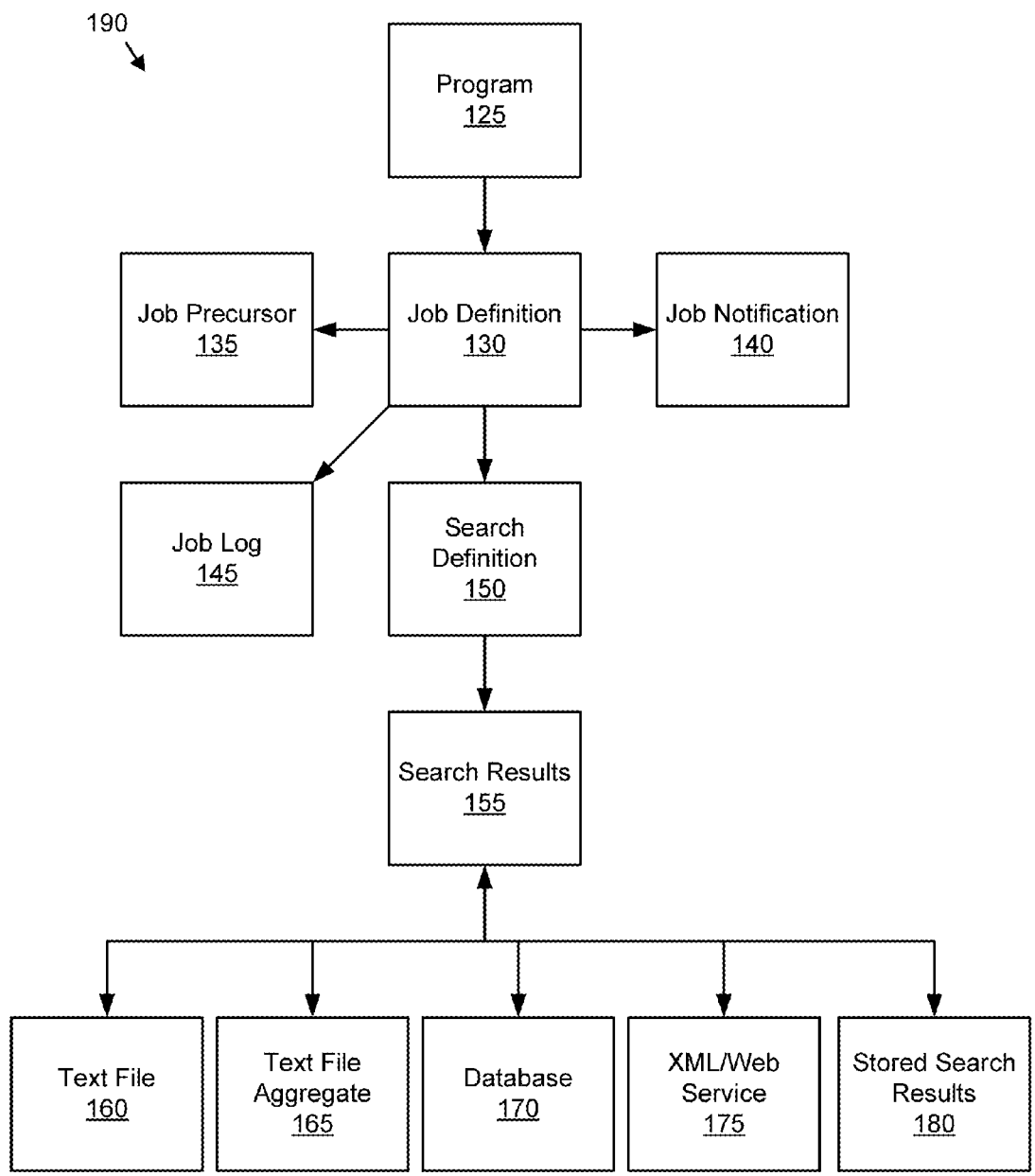
FIG. 1B is a schematic block diagram illustrating one embodiment of a search process.

FIG. 1B is a schematic block diagram illustrating one embodiment of a search process 190. The search process 190 may detect the search token mnemonic, search the search paths using the search rules for the search token mnemonic, and replace the search token mnemonic with a search result.

A program 125 may generate a document that includes a string. Alternatively, the program 125 may not generate the document. Instead the program 125 may scan the string in the document.

The string may be a text string. Alternatively, the string may be hypertext in a webpage, an entry in a database field, a cell in a spreadsheet, text in a message, or the like. The program 125 may be a word processor, a webpage, a database application, a spreadsheet application, a communication application, or the like.

The program 125 may detect the search token mnemonic in the string. The program 125 may activate a job definition 130 in response to detecting the search token mnemonic. The job definition 130 may be associated with the search token mnemonic. In one embodiment, the job definition 130 comprises a single search token. Alternatively, the job definition 130 may comprise one or more search token mnemonics in a relationship defined by one or more operators.

The job definition 130 may include a mnemonic for a job precursor 135. The job precursor 135 is a command file that performs one or more functions prior to executing the search tokens associated with the search token mnemonics of the job definition 130. In one embodiment, if the job precursor 135 and/or job definition 130 experiences an error, the execution of the job definition 130 may be terminated and the search token mnemonic may be replaced with an error message. The error message may be a job notification 140.

Alternatively, the job definition 130 may generate a job notification 140 that indicates a successful execution of the job definition 130. The job notifications 140 may be communicated to the computer 105. The job definition 130 may also generate the job log 145 detailing the results of the execution of the job definition 130.

The search token mnemonic is associated with the search token that includes a search definition 150. The search definition 150 may search one or more search paths in the data stores 120, including dissimilar search paths. As used herein, dissimilar search paths have one or more of a different data store 120 and different file types.

In one embodiment, the search definition 150 specifies two or more dissimilar search paths. The search paths may include a text file 160, a text file aggregate 165 with multiple text records, a database 170, an extensible markup language (XML)/web service 175, and/or stored search results 180. The search definition 150 further includes a search rule for the search paths. The search rule may be applied to the search paths to generate the search results 155.

In one embodiment, the job definition 130 may be resolved to a Boolean TRUE or a Boolean FALSE value. The one or more operators of the job definition 130 may operate on the search results 155 to generate a Boolean value. The job definition 130 may have a balance value "in balance" if the Boolean value is TRUE and "out of balance" if the Boolean value is FALSE. A TRUE balance value may indicate a successful completion of the job definition 130 while a FALSE balance value may indicate an unsuccessful completion of the job definition 130.

Figure 2A:
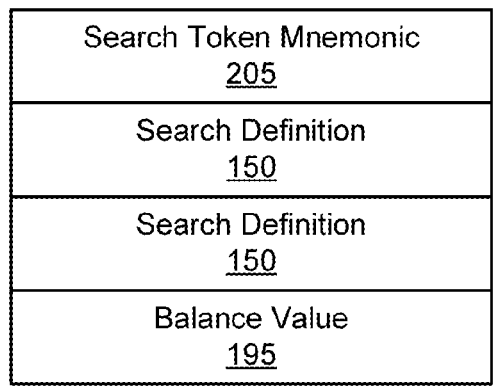
FIG. 2A is a schematic block diagram illustrating one embodiment of a search token.

FIG. 2A is a schematic block diagram illustrating one embodiment of a search token 200. The search token 200 maybe organized as a data structure in a memory. In the depicted embodiment, the search token 200 includes a search token mnemonic 205, one or more search definitions 150, and a balance value 195. The search token mnemonic 205 may be defined by a user and may uniquely identify the search token 200. The search definition 150 is described in more detail in FIG. 2C.

In one embodiment, the search token 220 may include operators that resolve search results from each search definition 150 into one of a Boolean TRUE value and a Boolean FALSE value.

The balance value 195 may indicate that the search token 200 and/or the job definition 130 associated with the search token 200 are one of "in balance," "out of balance," and "undefined." The balance value 195 may be "in balance" if both search results 155 are retrieved for each element of a search definition 150 and/or job definition 130 and if a result of the search token 200 and/or job definition 130 is resolved to a Boolean TRUE.

The balance value 195 may be "out of balance" if a result of the search token 200 and/or job definition 130 is resolved to a Boolean FALSE. The balance value 195 may be "undefined" if one or more search results 155 are not retrieved for a search definition 150 and/or job definition 130 due to a technical or search error in obtaining the target value.

Figure 2B:
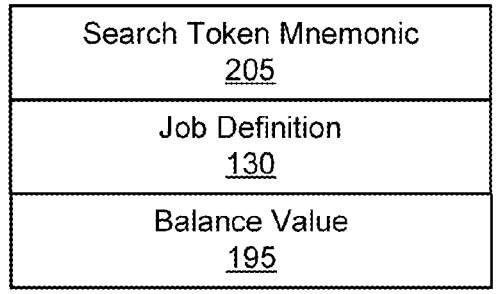
FIG. 2B is a schematic block diagram illustrating one alternate embodiment of a search token.

FIG. 2B is a schematic block diagram illustrating one alternate embodiment of a search token 200. In the depicted embodiment, the search token 200 includes the search token mnemonic 205, the job definition 130, and the balance value 195. The job definition 130 may comprise one or more search token mnemonics in a relationship defined by one or more operators. An example of a job definition 130 is shown hereafter in FIG. 4D. The balance value 195 may indicate whether the job definition 130 is resolved into a Boolean TRUE value or a Boolean FALSE value.

Figure 2C:
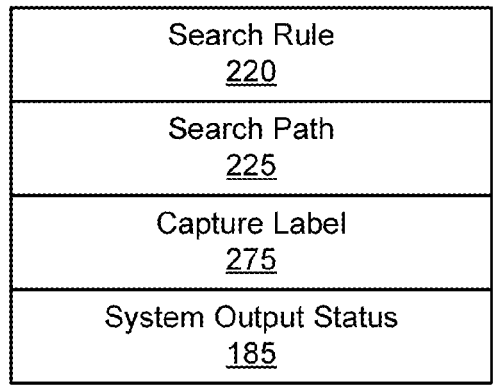
FIG. 2C is a schematic block diagram illustrating one embodiment of a search definition.

FIG. 2C is a schematic block diagram illustrating one embodiment of a search definition 150. The search definition 150 maybe organized as a data structure in a memory. In the depicted embodiment, the search definition 150 includes a search rule 220, a search path 225, a capture label 275, and a system output status 185.

Figure 2D:
FIG. 2D is a schematic block diagram illustrating one embodiment of a text search rule.

The search rule 220 is described in more detail in FIG. 2D. The search path 225 may specify one or more of a data store 120, one or more directories within a file system, and one or more files in the directories. In one embodiment, the search path 225 specifies a file type. In a certain embodiment, all files of the file type in the directories may be searched.

The capture label 275 may describe the search result 155. In one embodiment, the capture label 275 is included with the search result 155. The system output status 185 may record a system output describing the result of executing the search rule 220 at the search path 225. The system output status 185 may indicate that the execution of the search rule 220 was successful, that the execution of the search rule 220 was unsuccessful, and/or provide other information.

FIG. 2D is a schematic block diagram illustrating one embodiment of a text search rule 220. The text search rule 220 maybe organized as a data structure in a memory. The text search rule 220 may search the text file 160. In the depicted embodiment, the text search rule 220 includes one or more search events 235, capture columns 230, and the capture label 275.

The capture columns 230 may define columns that include the search results 155. The capture columns 230 may include a capture column start and a capture column end. The search events 235 may be text is associated with the desired search results 155. The computer 105 may search the capture columns 230 for the search events 235 and retrieve the data associated with the search events 235 as the search results 155.

Figure 2E:
FIG. 2E is a schematic block diagram illustrating one embodiment of a record search rule.

FIG. 2E is a schematic block diagram illustrating one embodiment of a record search rule 220. The record search rule 220 maybe organized as a data structure in a memory. In the depicted embodiment, the record search rule 220 includes a record count 240, a file modified date 245, and the capture label 275. The record count 240 may be a Boolean value that indicates that the search result 155 is a record count for the search path 225. The file modified date 245 may be a Boolean value that indicates that the search result 155 is a file modification date for the search path 225.

Figure 2F:
FIG. 2F is a schematic block diagram illustrating one embodiment of a database search rule.

FIG. 2F is a schematic block diagram illustrating one embodiment of a database search rule 220. The database search rule 220 maybe organized as a data structure in a memory. The database search rule 220 may search the database 170. In the depicted embodiment, the database search rule 220 includes a connection string 250, a data source 255, a structured query language (SQL) statement 260, and the capture label 275.

The connection string 250 may be a string that grants access to the data source 255. The connection string 250 may include an identifier of the data source 255, a user identifier, a secure credential, or combinations thereof.

The data source 255 may specify a database, a database table, a database query, a database report, or combinations thereof. The SQL statement 260 may comprise an SQL query statement that retrieves the search results 155 from the data source 255.

Figure 2G:
FIG. 2G is a schematic block diagram illustrating one embodiment of a markup language search rule.

FIG. 2G is a schematic block diagram illustrating one embodiment of a markup language search rule 220. The markup language search rule 220 maybe organized as a data structure in a memory. In the depicted embodiment, the markup language search rule 220 includes a universal resource locator (URL) 265, markup language text 270, a capture tag 210, and the capture label 275.

The URL 265 may indicate a website, a web-based data source, or combinations thereof such as the XML/Web Service 175. The markup text language 270 may be an XML query. The markup language search rule 220 may execute the markup text language 270 with the data source indicated by the URL 265 to retrieve the search results 155. The capture tag 210 may specify the tag in the result XML that comprises the desired search results 155.

Figure 2H:
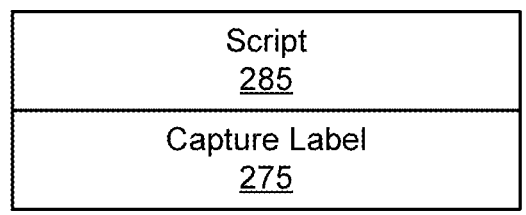
FIG. 2H is a schematic block diagram illustrating one embodiment of a script search rule.

FIG. 2H is a schematic block diagram illustrating one embodiment of a script search rule 220. The script search rule 220 maybe organized as a data structure in a memory. In the depicted embodiment, the script search rule 220 includes a script 285 and the capture label 275. The script 285 may be executed for the search path 225. The data that is generated from executing the script 285 at the search path 225 may be returned as the search results 155. The capture label 275 may be appended to the search results 155.

Figure 2I:
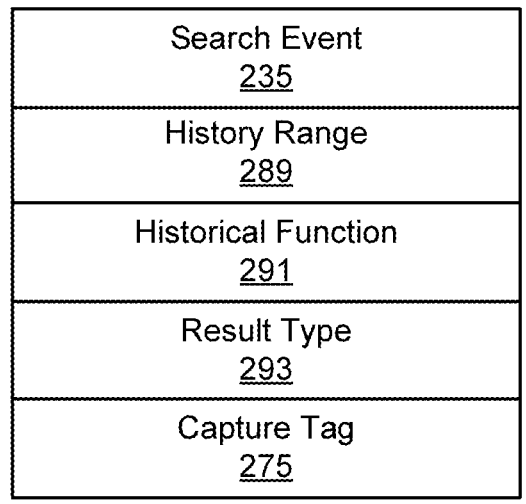
FIG. 2I is a schematic block diagram illustrating one embodiment of an aggregate results search rule.

FIG. 2I is a schematic block diagram illustrating one embodiment of an aggregate results search rule 220. The aggregate results search rule 220 maybe organized as a data structure in a memory. In the depicted embodiment, the aggregate results search rule 220 includes a search event 235, a history range 289, a historical function 291, a result type 293, and the capture tag 275.

The aggregate results search rule 220 may search one or more search paths 225. The aggregate results search rule 220 may search the text file aggregate 165. In one embodiment, the aggregate results search rule 220 search is the stored search results 180. The stored search results 180 are described in more detail in FIG. 2J. The search events 235 may be text is associated with the desired search results 155.

The history range 289 may specify a number of historical search results 155 that trail a first search result 155 found for the search event 235. The historical search results 155 may also include the search event 235.

The historical function 291 specifies a mathematical function such as an average function, a mean function, a median function, a minimum function, and a maximum function that are applied to the search results 155. In one embodiment, the historical function 291 is applied to the search results 155. The result type 293 may specify whether the search results 155 are numerical search results 155 or date search results 155.

FIG. 2J is a schematic block diagram illustrating one embodiment of the stored search results 180. The stored search results 180 may store search results 155 and or pointers to search results 155 from previous searches.

Figure 3A:
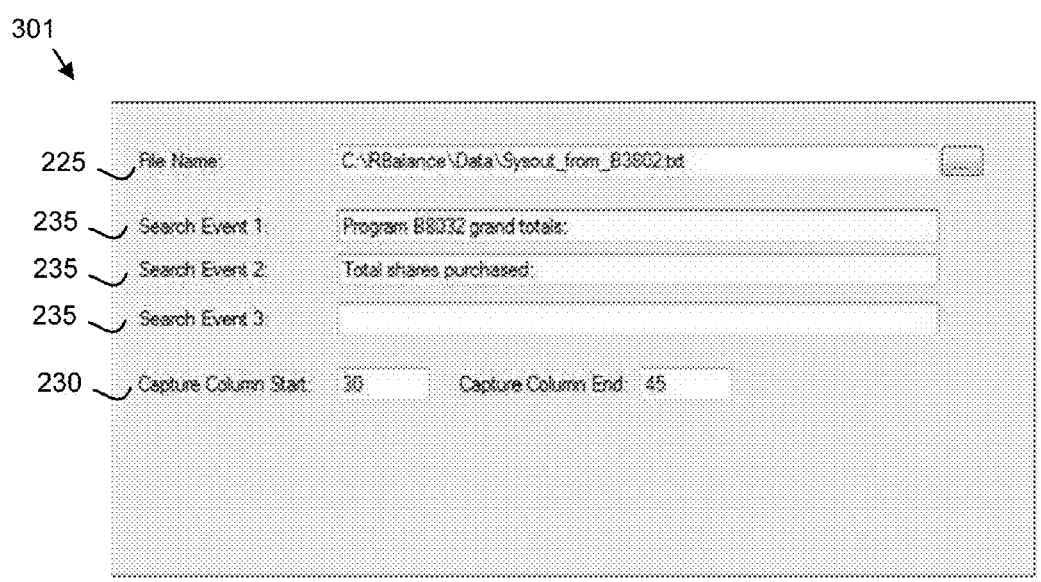
FIG. 3A is a diagram illustrating one embodiment of a text search rule setup panel.

FIG. 3A is a diagram illustrating one embodiment of a text search rule setup panel 301. The text search rule setup panel 301 may be displayed to a user. The text search rule setup panel 301 may receive one or more search events 235 and capture columns 230 for defining the text search rule 220 for a search definition 150. In addition, the text search rule setup panel 301 may receive the search path 225 for the search definition 150.

Figure 3B:
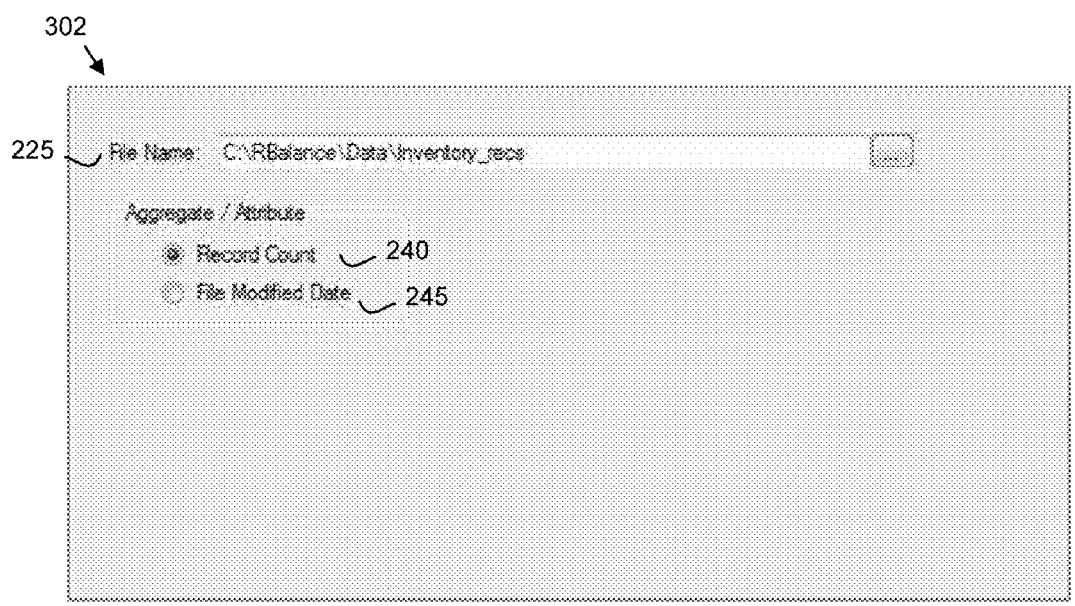
FIG. 3B is a diagram illustrating one embodiment of a record search rule setup panel.

FIG. 3B is a diagram illustrating one embodiment of a record search rule setup panel 302. The record search rule setup panel 302 may be displayed to the user to define the record search rule 220. In the depicted embodiment, the record search rule setup panel 302 receives the file modified date 245 and the record count 240. In addition, the record search rule setup panel 302 receives the search path 225.

Figure 3C:
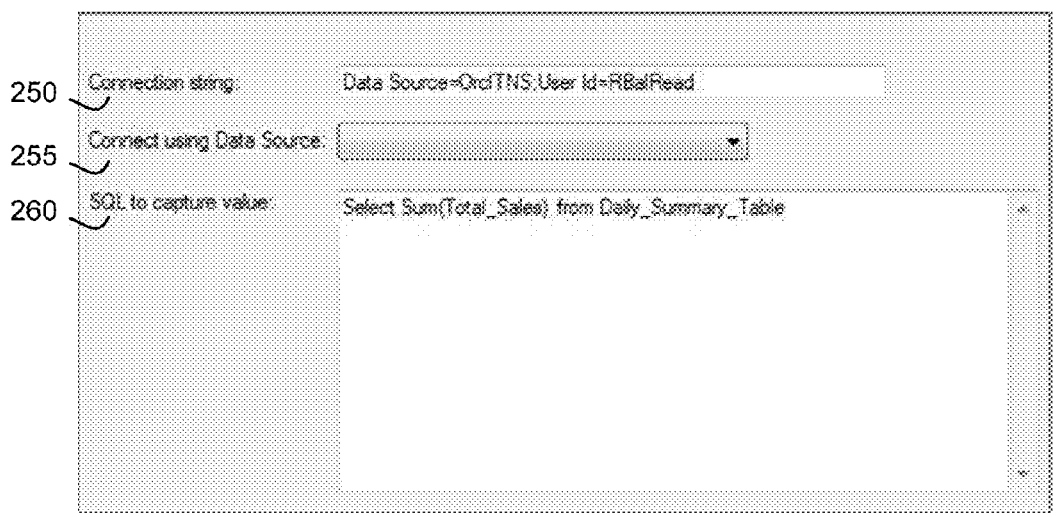
FIG. 3C is a diagram illustrating one embodiment of a database search rule setup panel.

FIG. 3C is a diagram illustrating one embodiment of a database search rule setup panel 303. The database search rule setup panel 303 may be displayed to the user to define the database search rule 220. In the depicted embodiment, the database search rule setup panel 303 receives the connection string 250, the data source 255, and the SQL statement 260.

Figure 3D:
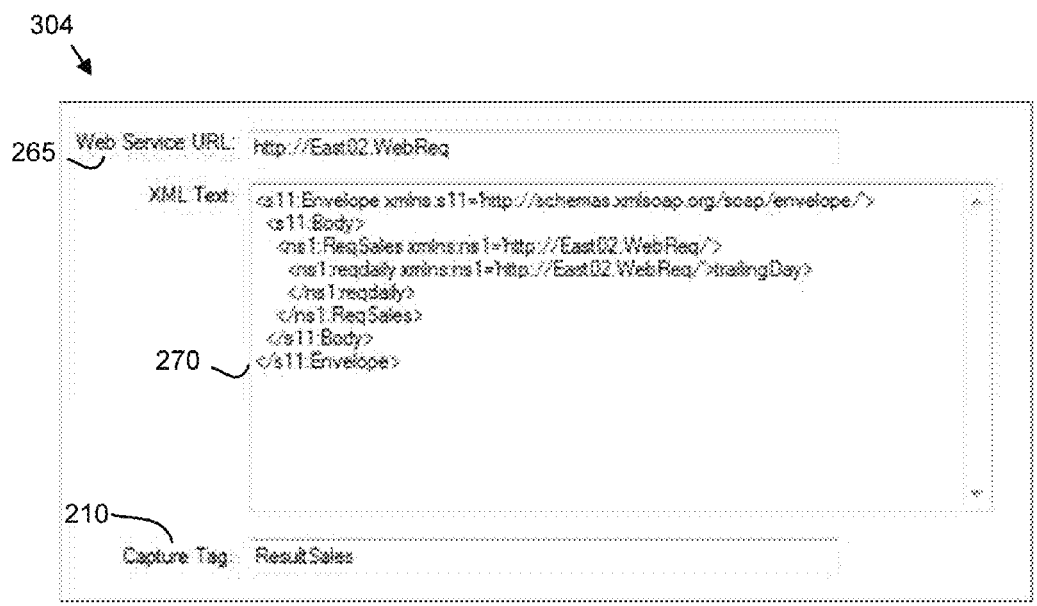
FIG. 3D is a diagram illustrating one embodiment of a markup language search rule setup panel.

FIG. 3D is a diagram illustrating one embodiment of a markup language search rule setup panel 304. The markup language search rule setup panel 304 may be displayed to the user to define the markup language search rule 220. In the depicted embodiment, the markup language search rule setup panel 304 receives the URL 265, the markup language text 270, and the capture tag 210.

Figure 3E:
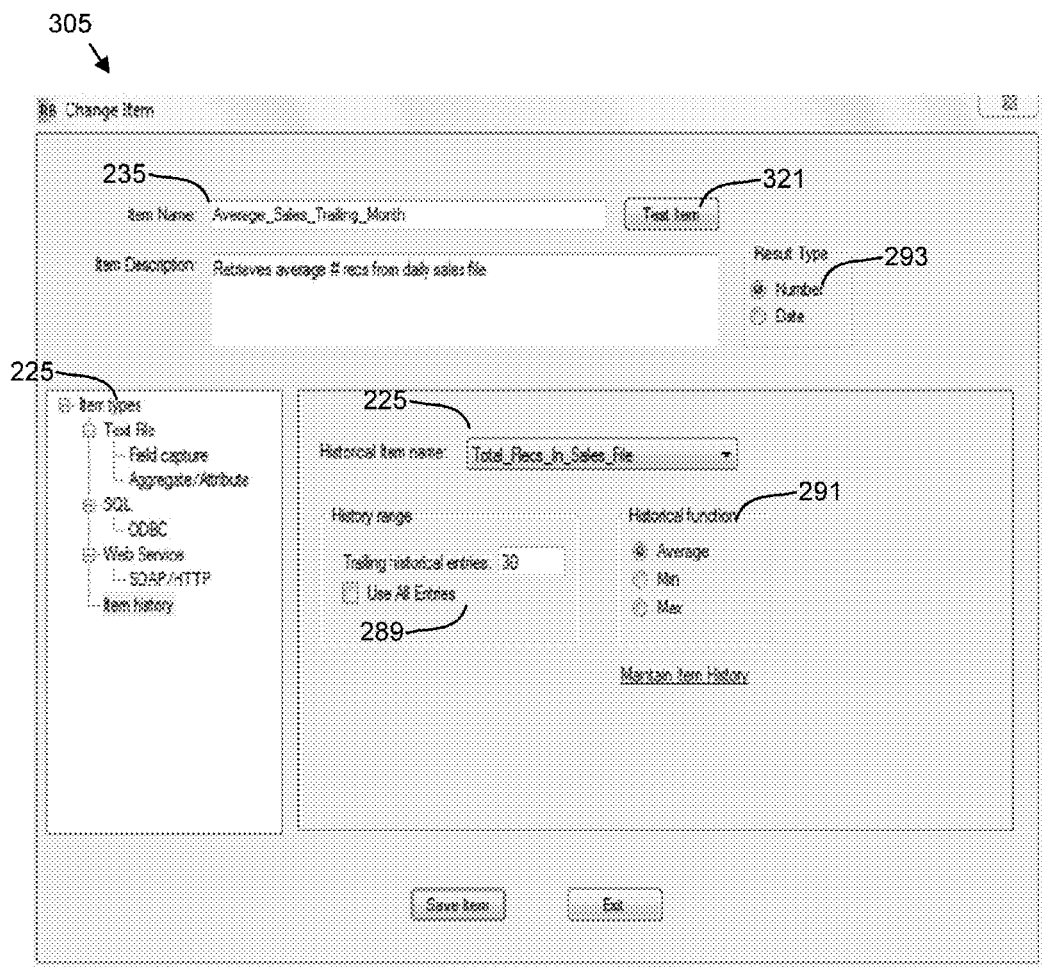
FIG. 3E is a diagram illustrating one embodiment of an aggregate results search rule setup panel.

FIG. 3E is a diagram illustrating one embodiment of an aggregate results search rule setup panel 305. The aggregate results search rule setup panel 305 may be displayed to the user to define the aggregate results search rule 220. In the depicted embodiment, the aggregate results search rule setup panel 305 receives the search event 235, the history range 289, and the history function 291. In addition, the aggregate results search rule setup panel 305 may receive the search path 225. In the depicted embodiment, the search path 225 is entered as one or more of an item type and a file. The user may specify the result type 293.

Figure 3F:
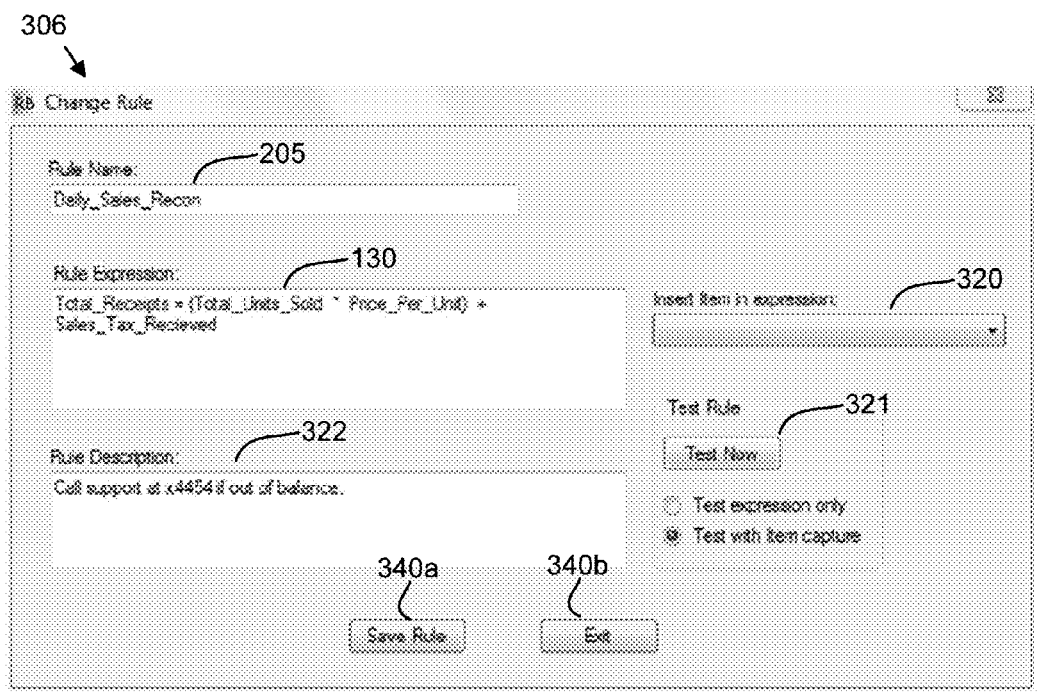
FIG. 3F is a diagram illustrating one embodiment of a job definition setup panel.

FIG. 3F is a diagram illustrating one embodiment of a job definition setup panel 306. The job definition setup panel 306 may be displayed to the user to define the job definition 130. In the depicted embodiment, the job definition setup panel 306 receives the search token mnemonic 205 and the job definition 130. In addition, the user may specify a rule description 322 for the job description 130. The rule description 322 may be saved with the job description 130. The job definition setup panel 306 also includes panel controls 340. In the depicted embodiment, the panel controls 340 include a save panel control 340a that saves the job definition 130 and exit panel control 340b that exits the job definition setup panel 306.

In one embodiment, the job definition setup panel 306 includes a test command 321. The test command 321 may support a test of the expression of the job description 130. Alternatively, the test command 321 may support the retrieval of search results 155 using the job description 130.

Figure 3G:
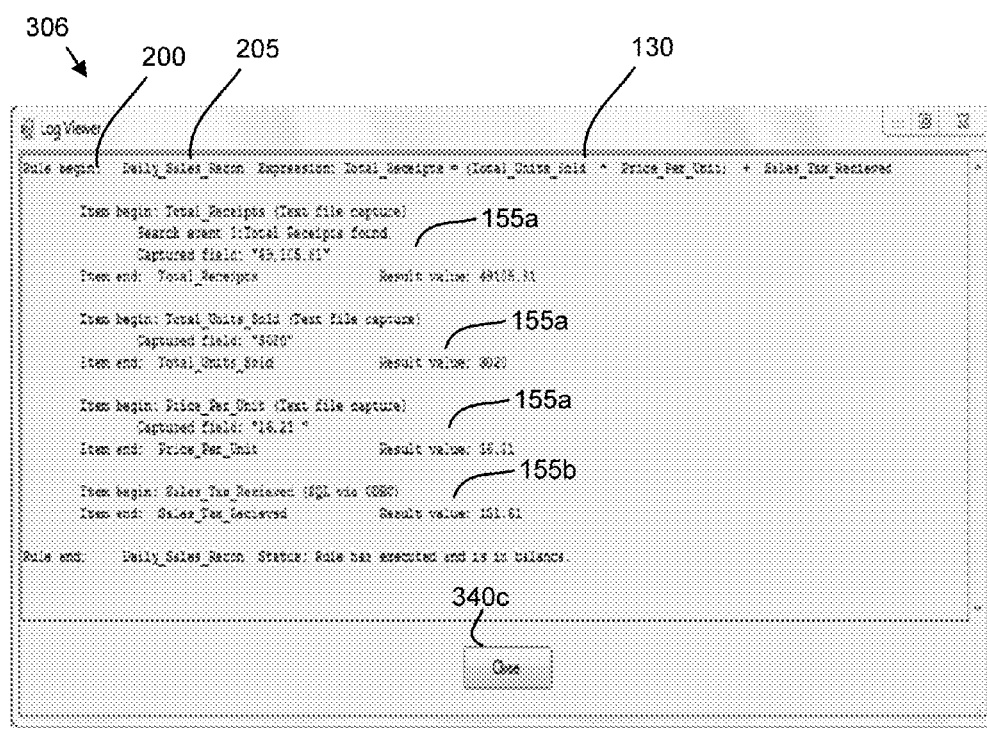
FIG. 3G is a diagram illustrating one embodiment of a log panel.

FIG. 3G is a diagram illustrating one embodiment of a log panel 306. The log panel 306 may display the job log 145. In the depicted embodiment, the job log 145 includes search results 307. The search results 155 include text search rule 220 search results 155a and a database search rule 220 search results 155b. The search results 155 are for a single search token 200 with the search token mnemonic 205 of "Daily_Sales_Recon." In the depicted embodiment, the search token 200 includes a job definition 130 that includes a plurality of search token mnemonics 205 in relationships defined by one or more operators. A close panel control 340c may close the log panel 306.

Figure 3H:
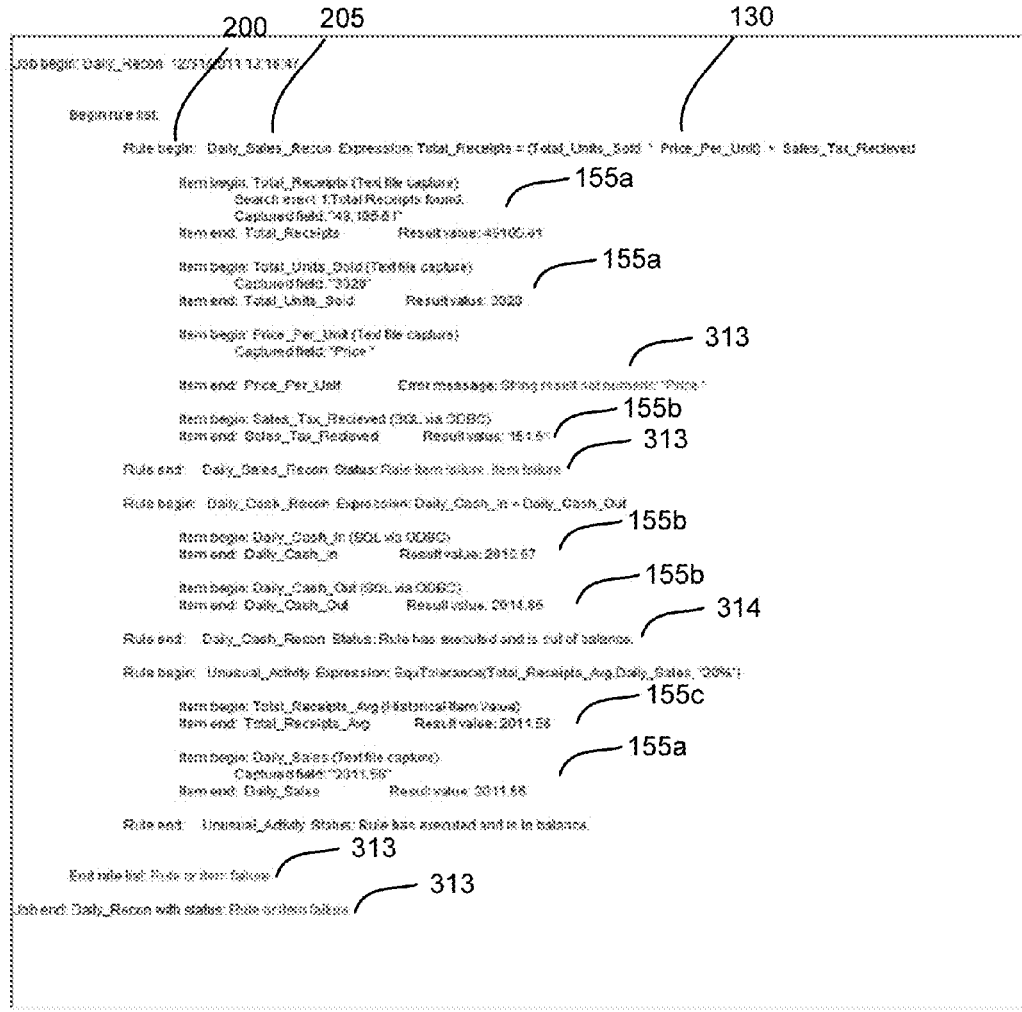
FIG. 3H is a diagram illustrating one alternate embodiment of a log panel.

FIG. 3H is a diagram illustrating one alternate embodiment of the log panel 306. The log panel 306 display search results 307c for an aggregate results search rule 220. In addition, the log panel 306 may display one or more error messages 313 and one or more out of balance messages 314. The error messages 313 and/or out of balance messages 314 may be generated from the system output status 185.

Figure 3I:
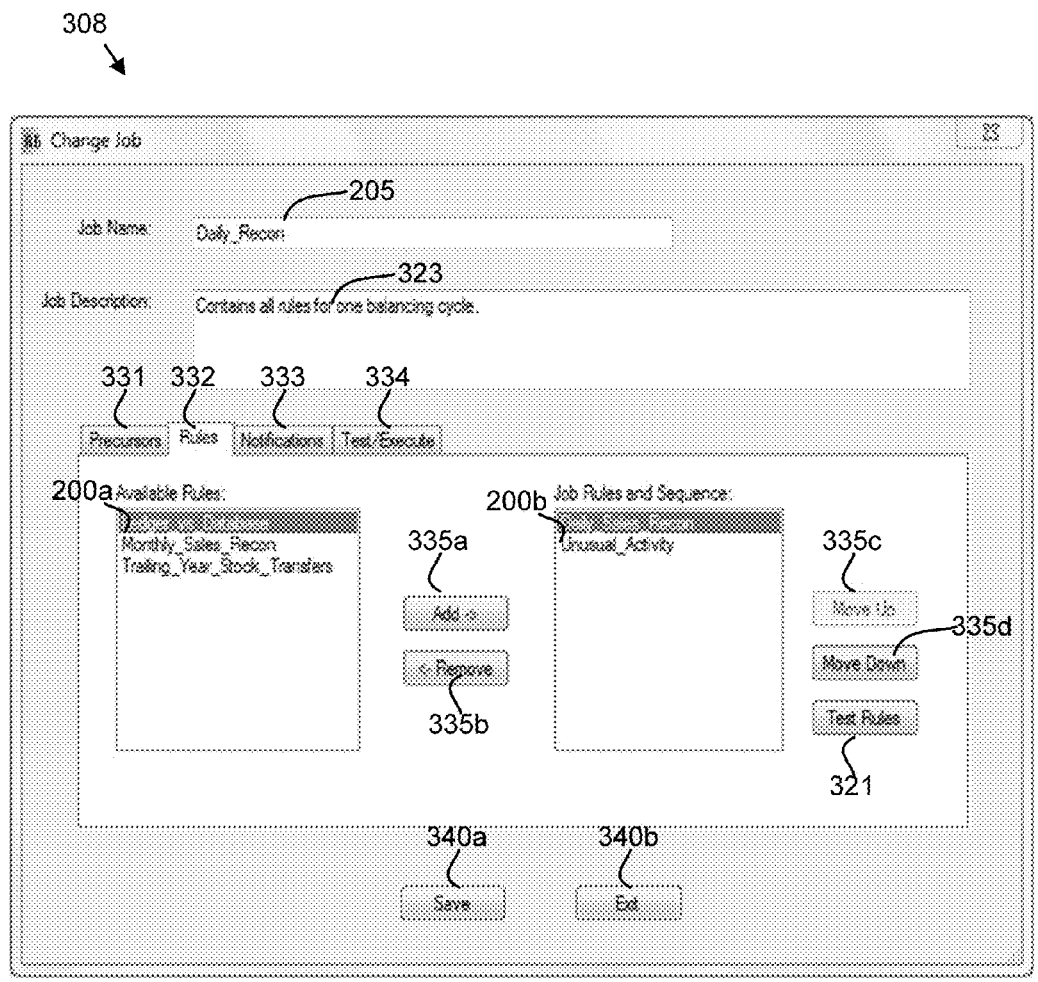
FIG. 3I is a diagram illustrating one embodiment of a job setup panel.

FIG. 3I is a diagram illustrating one embodiment of a job definition setup panel 308. The job definition setup panel 308 may create a job definition 130. The job definition setup panel 308 may be displayed to the user. In the depicted embodiment, the job definition setup panel 308 includes a search token mnemonic 205 for the job definition 130, a job description 323, a precursor tab 331, a rules tab 332, a notifications tab 333, and a test/execute tab 334. The job definition setup panel 308 is depicted with the rules tab 332 displayed.

In the rules tab 332 available search tokens 200a may be added to the search tokens 200b of a job definition 130 using an add job control 335a. In addition, search tokens 200b may be removed from the job definition 130 using a removed job control 335b. The order of search tokens 220b may be changed using a move up job control 335c and a move down job control 335d. The job definition 130 may be tested using the test command 321.

Figure 3J:
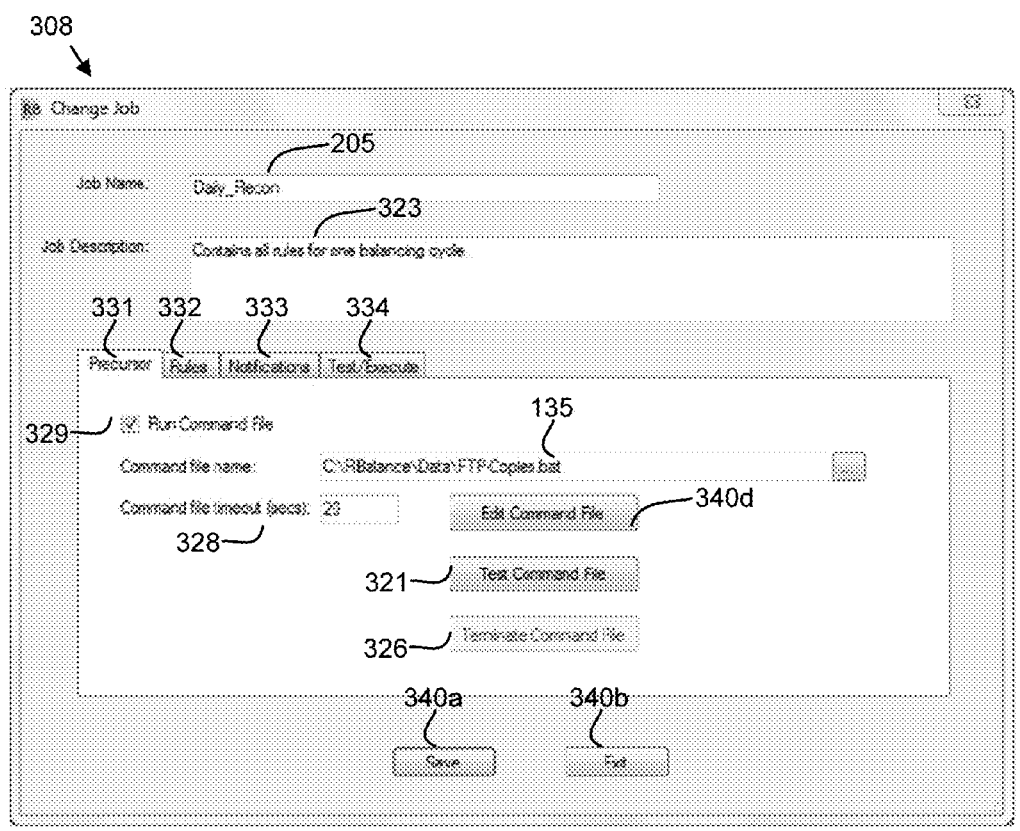
FIG. 3J is a diagram illustrating one alternate embodiment of a job setup panel.

FIG. 3J is a diagram illustrating one embodiment of the job definition setup panel 308 with a precursor tab 331 displayed. The job definition setup panel 308 with the precursor tab 331 may be displayed to the user. The user may specify the job precursor 135. In addition, the edit panel control 340d may be selected to edit the job precursor 135. The run job precursor command 329 may specify whether the job precursor 135 is executed for a job definition 130.

The test command 321 may be used to test the job precursor 135. The terminate command 326 may terminate testing the job precursor 135. The command file timeout 328 may specify a timeout value for terminating executing the job precursor 135

Figure 3K:
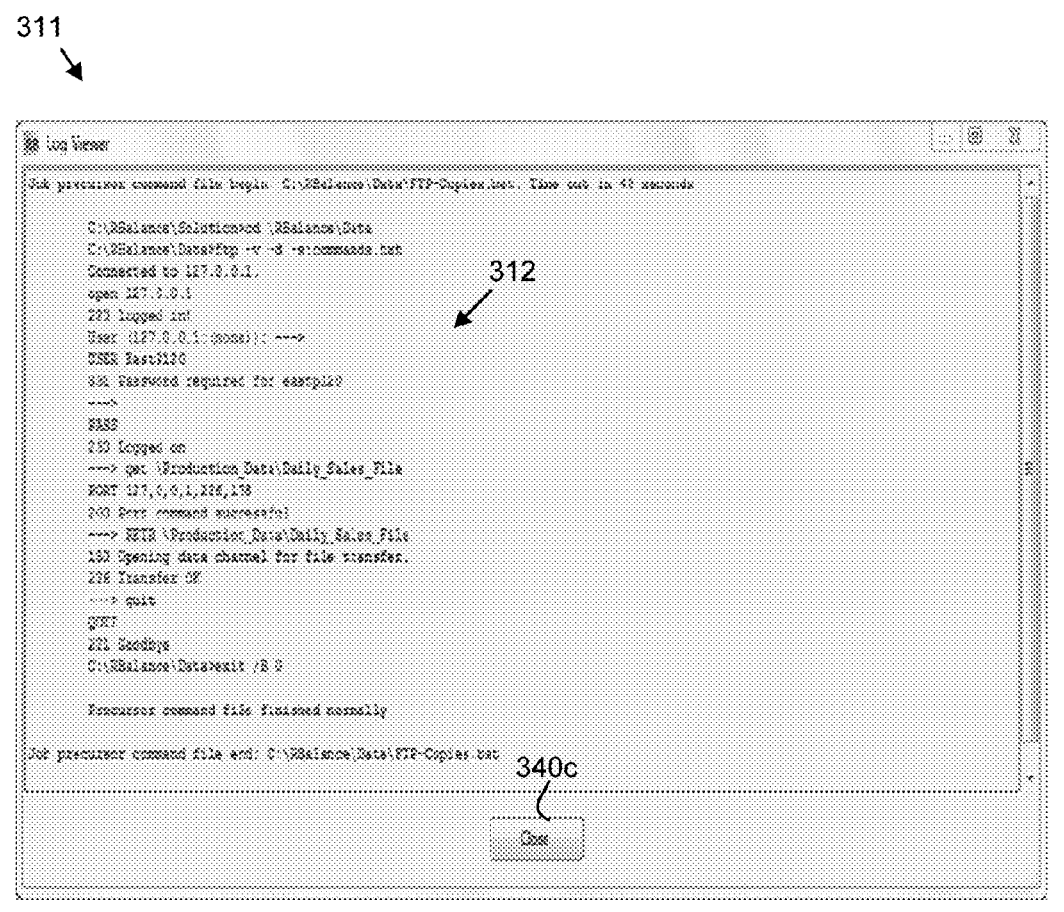

FIG. 3K is a diagram illustrating one embodiment of a precursor file execution log panel 311. The precursor file execution log panel 311 may be displayed to show the results of executing the job precursor 135. The precursor file execution log panel 311 includes job precursor execution results 312.

Figure 3L:
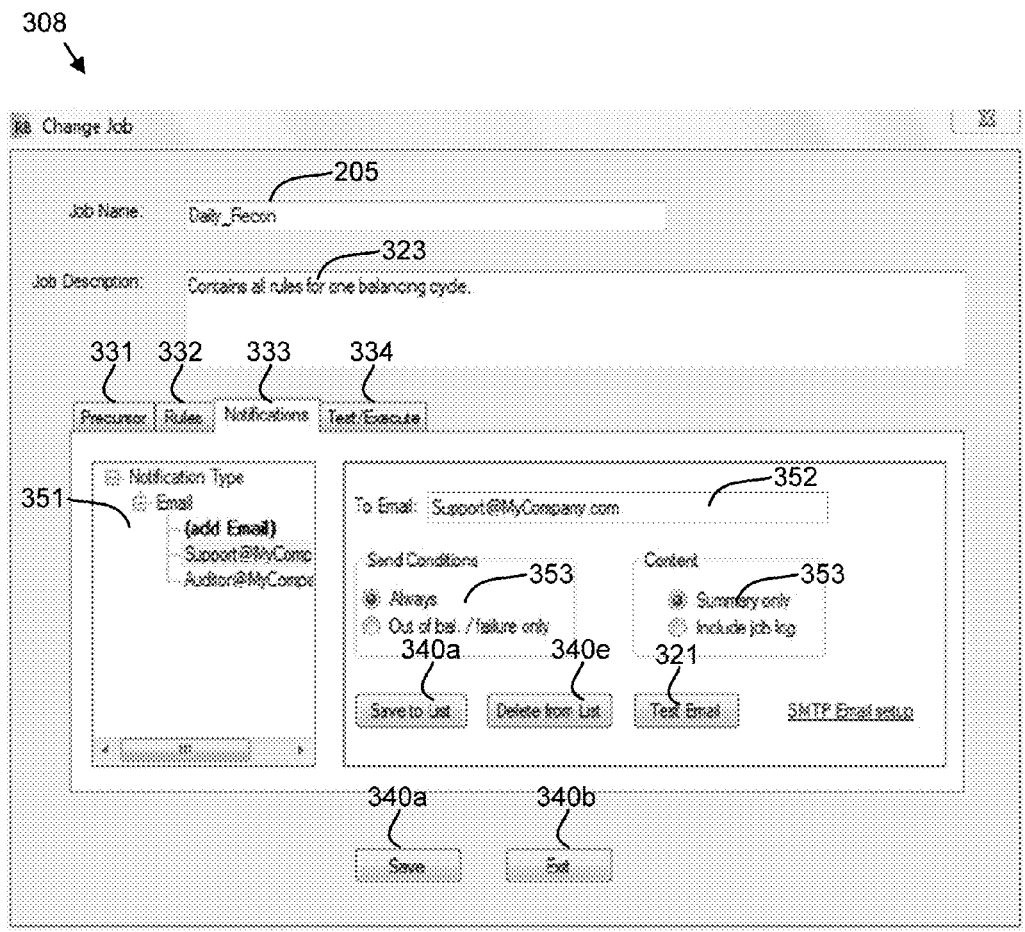
FIG. 3L is a diagram illustrating one alternate embodiment of a job setup panel.

FIG. 3L is a diagram illustrating one embodiment of a job definition setup panel 308 with the notifications tab 333 displayed. The notifications tab 333 specifies a notification type 351, a notification address 352, and notification conditions 353. The test command 321 may test the notification. The panel commands 340 may save and/or delete the notification, save the job definition 130, and exit the job definition setup panel 308.

Figure 3M:
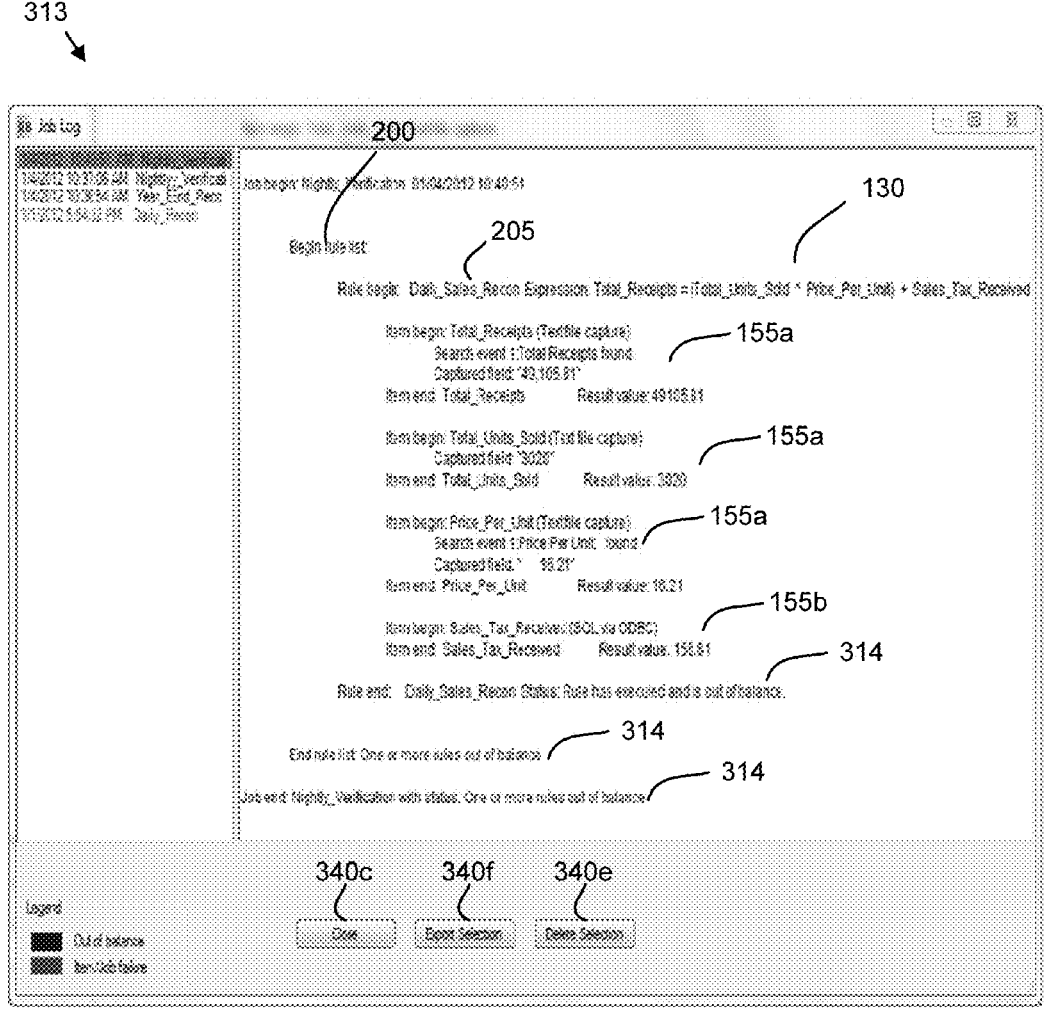
FIG. 3M is a diagram illustrating one embodiment of a job log screen.

FIG. 3M is a diagram illustrating one embodiment of a job log screen 313. A search token 220 is displayed with search token mnemonic 205 and job definition 130. In addition, search results 155 are displayed. In the depicted embodiment, out of balance messages 314 are displayed indicating that the search token 220 and/or search rules 220 incorporated therein are out of balance.

Figure 3N:
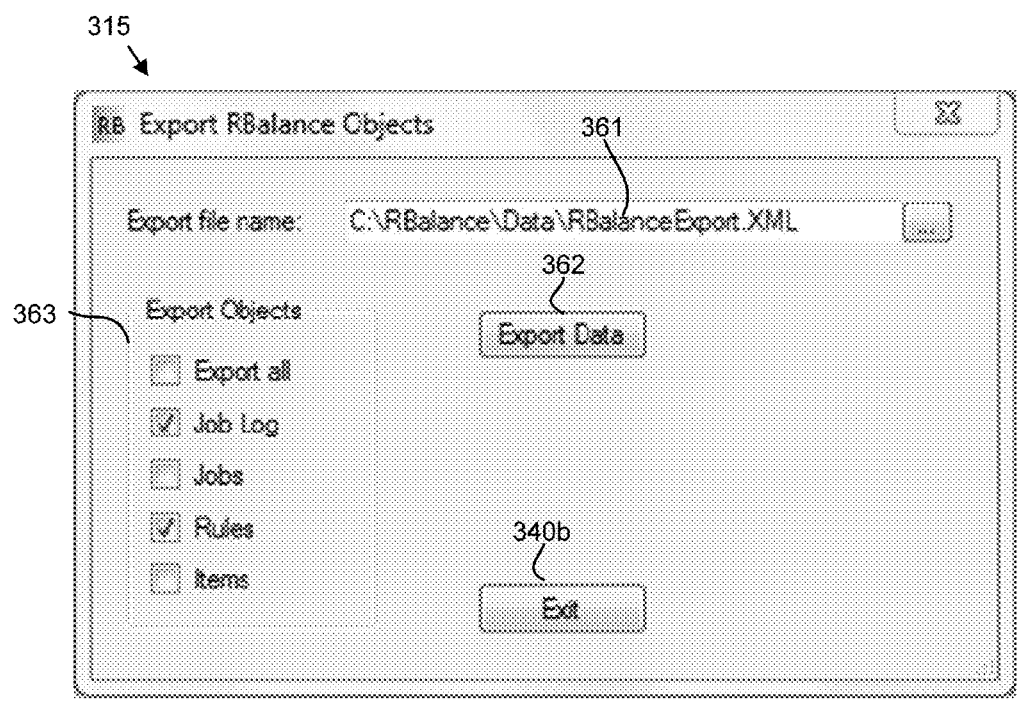
FIG. 3N is a diagram illustrating one embodiment of an export panel.

FIG. 3N is a diagram illustrating one embodiment of an export panel 315. The export panel 315 may be displayed to the user. The user may specify an export path 361 and export objects 363 from a job definition 130 to be exported to the export path 361. The export command 362 may initiate the export of the export objects 363.

Figure 3O:
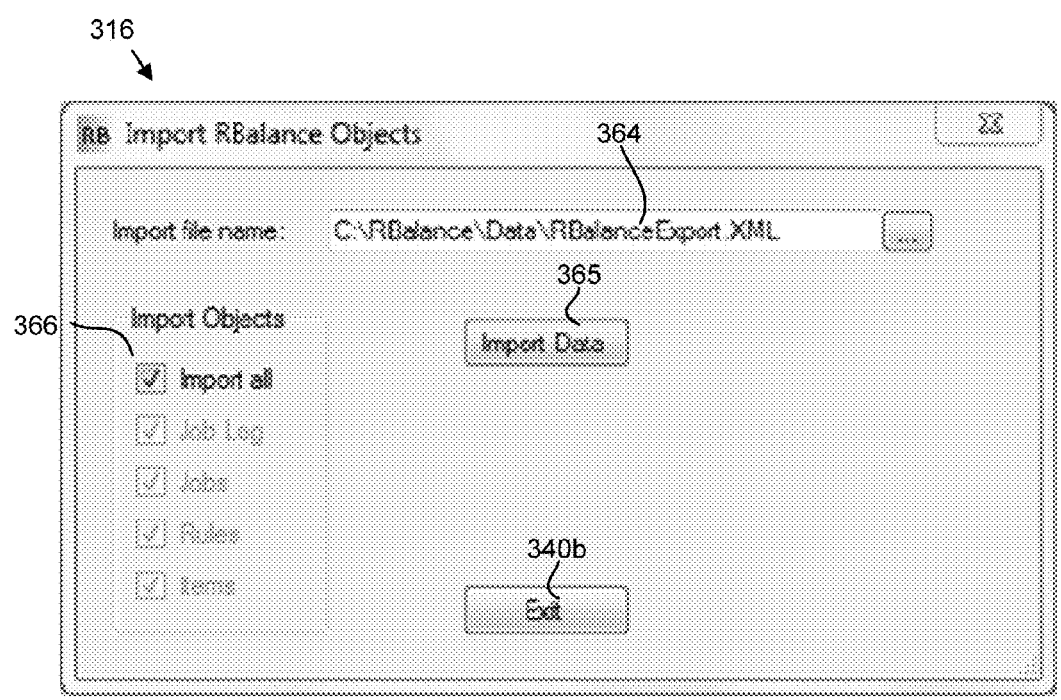
FIG. 3O is a diagram illustrating one embodiment of an import panel.

FIG. 3O is a diagram illustrating one embodiment of an import panel 316. The import panel 316 may be displayed to the user. The user may specify an import path 364 and import objects 366 to import from a job definition 130 at the import path 364. The import command 365 may initiate the import of the import objects 366.

FIG. 4A is a text diagram illustrating one embodiment of embedded search token mnemonics 205 in a string 370. The string 370 may be embedded in a text file, a word processing document, a web page, a message such as an email message or text message, a spreadsheet, or the like. The string 370 includes a plurality of search token mnemonics 205. In addition, the string includes operators 310. The search token mnemonics 205 and/or operators may be demarked by a specified character or combination of characters such as "<<," ">>," "#," "@," and the like.

The operators 310 may be selected from the group consisting of arithmetic operators, logical operators, text operators, formatting operators, and date operators. An operation performed by each operator 310 may be performed on the search results 155 for the search token mnemonics 205.

The embodiments may detect the search token mnemonics 205 in the string 370. The embodiments may further search the search paths 225 using the search rules 220 associated with the search token 200 of the search token mnemonics 205.

FIG. 4B is a text diagram illustrating one embodiment of search results 155 replacing search token mnemonics 205. The string 370 of FIG. 2A is shown with the search token mnemonics 205 replaced by corresponding search results 155.

FIG. 4C is a text diagram illustrating one embodiment of a job definition 130 in a string 370. A string 370 is shown with an embedded job definition search token mnemonic 205j that accepts search token mnemonics 205 as arguments.

FIG. 4D is a text diagram illustrating one embodiment of the job definition 130 of FIG. 4C. An embedded job definition search token mnemonic 205j accepts arguments 320. The arguments 320 are used with operators 310 and constants 325 to define the job definition 130.

Figure 4E:
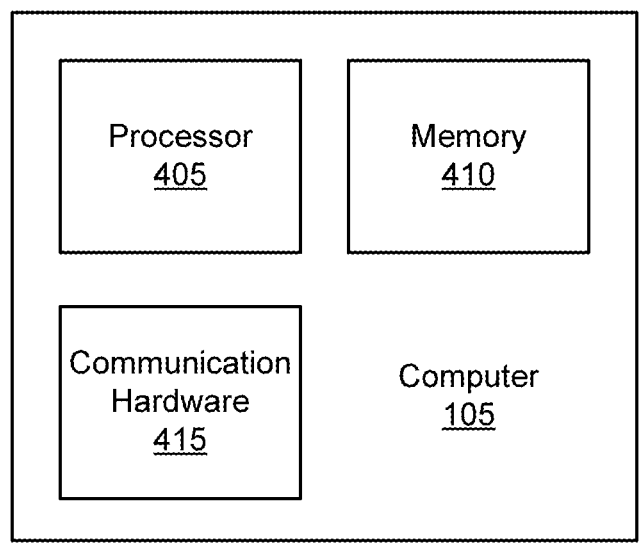
FIG. 4E is a schematic block diagram illustrating one embodiment of a computer.

FIG. 4E is a schematic block diagram illustrating one embodiment of the computer 105. The computer 105 includes a processor 405, a memory 110, and communication hardware 415. The memory 410 may include a semiconductor storage device, a hard disk drive, an optical storage device, a micromechanical storage device, or combinations thereof. The memory 410 may store code. The processor 405 may execute the code. The communication hardware 415 may communicate with other devices such as the memory store 120 and/or the network 115.

Figure 5:
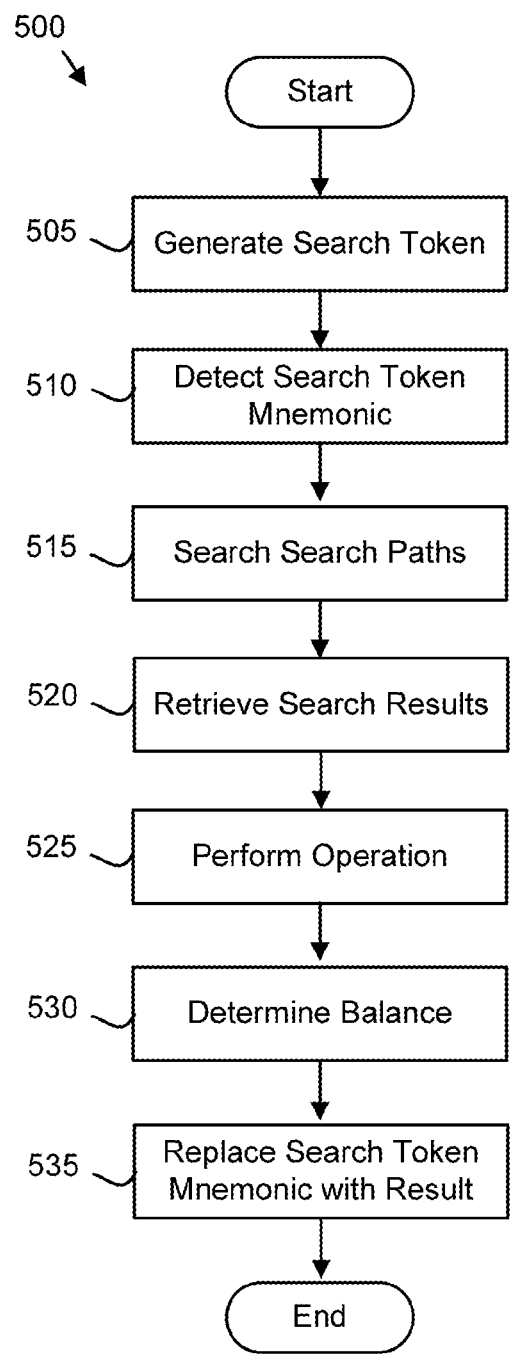
FIG. 5 is a schematic flow chart diagram illustrating one embodiment of a search token mnemonic method.

FIG. 5 is a schematic flow chart diagram illustrating one embodiment of a search token mnemonic method 500. The method 500 may detect the search token mnemonic 205 in a string 370, search the search paths 225 using the search rules 220, and replace the search token mnemonic 205 with a search result 155 in the string 370. The method 500 may be performed by the processor 405. Alternatively, the method 500 may be performed by computer readable storage medium such as the memory 410.

The method 500 starts, and in one embodiment, the code generates 505 the search token 200. For example, a user may use the text search rule setup panel 301, the record search rule setup panel 302, the database search rule setup panel 303, the markup language search rule setup panel 304, the aggregate results search rule setup panel 305, and/or the job definition setup panel 306 to generate the search token 200, the search token mnemonic 205 for the search token 200, and the search definitions 150 and/or job definition 130 for the search token 200. The code may save the search token 200 to the computer 105, a data store 120, and/or a server 110.

The code may detect 510 the search token mnemonic 205 in a string 370. In one embodiment, the code scans each string 370 in the document for the search token mnemonic 205. The search token mnemonic 205 is detected 510 when text in the string 370 matches the search token mnemonic 205.

The code may search 515 the search paths 225 defined by the search definition 150 of the search token 200 associated with the search token mnemonic 205. Alternatively, the code may search 515 the search paths 225 of the search definitions 150 of the search token mnemonics 205 associated with the job definition 130 of the search token 200.

In one embodiment, the code searches 515 the capture columns 230 of the search path 225 for one or more search events 235. The search events 235 may be text phrases within the capture columns 230. The code may retrieve 520 values associated with the search events 235 as the search results 155.

In alternate embodiment, the code searches 515 the search path 225 for a record count 240 of a file. In addition, the code may search 515 the search path 225 for the file modified date 245 of one or more files. The code may retrieve 520 the record count 240 and/or the file modified date 245 as the search results 155.

In one embodiment, the code connects with the data source 255 at the search path 225 using the connection string 250. In addition, the code may search 515 the data source 255 using the SQL statement 260. The code may retrieve 520 the result of executing the SQL statement 260 as the search result 155.

The code may search 515 the search path 225 by executing the markup language text 270 at the URL 265. In addition, the code may retrieve 520 the result of executing the markup language text 270 as the search result 155.

In one embodiment, the code searches 515 the search path 225 by executing the script 285 at the search path 225. The code may retrieve 520 the result of executing the script 285 as the search result 155.

The code may search 515 the search path 225 for the search event 235 of the result type 393. In one embodiment, the code searches 515 the history range 289 for the search event 235. In addition, the code may apply the historical function 291 to the search events 235 found in the historical range 289. The code may retrieve 520 the search events 235 for the historical range 289. Alternatively, the code may retrieve 520 the result of the historical function 291 applied to the search events 235 found in historical range 289.

In one embodiment, the code performs 525 operations 310 embedded in the string 370 on the search results 155 for the search result mnemonics 205. For example, the code may perform 525 one or more arithmetic operations 310 that are embedded in the string 370 as illustrated in FIG. 4B.

Alternatively, the code may perform 525 operations 310 that are embedded in the job description 130. For example, the code may perform 525 the operations 310 on the search results 155 for the search token mnemonics 205 and/or arguments 320 of a job definition 130 as illustrated in FIG. 4D.

In one embodiment, the code determines 530 the balance value 195 for the search token 200 associated with the search token mnemonic 205. The code may determine 530 the balance value 195 from the system output status 185. In one embodiment, the code determines 530 the balance value 195 to be "in balance" if all search definitions 150 and/or job definitions 130 for the search token 200 successfully returned search results 155 and if the result of the search results 155 and operations 310 applied to the search results 155 yield a Boolean TRUE.

In one embodiment, the balance value 195 is "out of balance" if the result of the search results 155 and operations 310 applied to the search results 155 yield a Boolean FALSE. In addition, the balance value 195 may be "undefined" if search results 155 are not retrieved for one or more search definitions 150 and/or job definitions 130.

The code may replace 535 the search token mnemonic 205 with the retrieve search results 155 and the method 500 ends. In addition, the code may replace 535 the search token mnemonic 205 with the results of any operations 310 performed on the search results 155 for the search token mnemonic 205.

In one embodiment, the code further replaces 535 the search token mnemonic 205 with the out of balance message 314 if the balance value 195 is "out of balance." In addition, the code may replace 535 the search token mnemonic 205 with the error message 313 if the balance value 195 is "undefined."

The embodiments detect the search token mnemonic 205 in the string 370 and in response to detecting the search token mnemonic 205 search the search paths 225 using the search rules 220 for the search token 200 associated with the search token mnemonic 205. The embodiments further replace the search token mnemonic 205 with the search result 155 in the string 370. As a result, documents may be prepared using the search token mnemonic 205 in place of data. When a document is generated such as when it is viewed or published, the data associated with the search token mnemonic 205 may be retrieved and replace the search token mnemonic 205. As a result, the document may be generated with up-to-date data even if the document itself has not been updated in some time. In addition, by reporting whether the search token 200 for the search token mnemonic 205 resulted in an "in balance" or "out of balance" search result 155, the status of the data is easily ascertained.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A program product comprising a non-transitory computer readable storage medium that stores code executable by a processor to perform:
    detecting a search token mnemonic in a string, wherein the string comprises one or more operators selected from the group consisting of arithmetic operators, logical operators, text operators, formatting operators, and date operators and the search token mnemonic is associated to a search token comprising two or more search definitions and a balance value, each search definition specifies a search rule for one or more dissimilar search paths and that comprises a search path, a capture label, a system output status, a search event, a history range that specifies a number of historical search results that trail search results, a historical function that is applied to the search results, a result type, and a capture tag;
    searching the search paths using the search rule, wherein the balance value is in balance when the two or more search definitions each retrieve search results in the search event and the search token is resolved to a Boolean TRUE, the balance value is out of balance when the search token is resolved to a Boolean FALSE, and the search token is undefined when any one of the two or more search definitions does not retrieve search results;
    performing an operation specified by the one or more operators on the search results for the search token mnemonic; and
    replacing the search token mnemonic with a search result in the string in response to the balance value being in balance.

2. The program product of claim 1, where the search token mnemonic is associated with a job definition comprising one or more first search token mnemonics in a relationship defined by one or more operators.

3. The program product of claim 1, wherein the string and the search result are embedded in one of a word processing document, a web page, a message, and a spreadsheet.

4. The program product of claim 1, wherein the search definition comprises a system output status.

5. The program product of claim 1, wherein the search definition specifies a text search rule.

6. The program product of claim 1, wherein the search definition specifies a record search rule.

7. The program product of claim 1, wherein the search definition specifies a database search rule.

8. The program product of claim 1, wherein the search definition specifies a markup language search rule.

9. The program product of claim 1, wherein the search definition specifies an aggregate results search rule.

10. The program product of claim 1, wherein the search definition specifies a script search rule.

11. The program product of claim 1, the code further storing the search result.

12. A method comprising:
    detecting, by use of a processor, a search token mnemonic in a string, wherein the string comprises one or more operators selected from the group consisting of arithmetic operators, logical operators, text operators, formatting operators, and date operators and the search token mnemonic is associated to a search token comprising two or more search definitions and a balance value, each search definition specifies a search rule for one or more dissimilar search paths and that comprises a search path, a capture label, a system output status, a search event, a history range that specifies a number of historical search results that trail search results, a historical function that is applied to the search results, a result type, and a capture tag;
    searching the search paths using the search rule, wherein the balance value is in balance when the two or more search definitions each retrieve search results in the search event and the search token is resolved to a Boolean TRUE, the balance value is out of balance when the search token is resolved to a Boolean FALSE, and the search token is undefined when any one of the two or more search definitions does not retrieve search results;
    performing an operation specified by the one or more operators on the search results for the search token mnemonic; and
    replacing the search token mnemonic with a search result in the string in response to the balance value being in balance.

13. The method of claim 12, where the search token mnemonic is associated with a job definition comprising one or more first search token mnemonics in a relationship defined by one or more operators.

14. The method of claim 12, wherein the string and the search result are embedded in one of a word processing document, a web page, a message, and a spreadsheet.

15. The method of claim 14, wherein the search definition comprises a system output status.

16. The method of claim 12, wherein the search definition specifies a text search rule.

* * * * *